(12) United States Patent
Tanabe

(10) Patent No.: US 6,874,857 B2
(45) Date of Patent: Apr. 5, 2005

(54) HYDRAULIC CIRCUIT FOR TRAVELING

(75) Inventor: Sadayuki Tanabe, Gifu (JP)

(73) Assignee: Teijin Seiki Co., Ltd., Tokyo (JP)

( * ) Notice: Subject to any disclaimer, the term of this patent is extended or adjusted under 35 U.S.C. 154(b) by 0 days.

(21) Appl. No.: 10/324,204

(22) Filed: Dec. 20, 2002

(65) Prior Publication Data
US 2003/0089543 A1 May 15, 2003

Related U.S. Application Data

(62) Division of application No. 09/968,205, filed on Oct. 1, 2001, now Pat. No. 6,648,091.

(30) Foreign Application Priority Data
Oct. 2, 2000 (JP) ..................................... P2000-302642

(51) Int. Cl.$^7$ ............................................... B60T 13/18
(52) U.S. Cl. ......................... 303/11; 303/6.01; 188/71.5
(58) Field of Search ............................... 188/71.5, 166, 188/167, 170; 303/3, 6.01, 9.72, 11

(56) References Cited

U.S. PATENT DOCUMENTS

| | | | | |
|---|---|---|---|---|
| 4,236,595 A | * | 12/1980 | Beck et al. .................. 180/243 |
| 4,254,845 A | | 3/1981 | Braun | |
| 4,560,034 A | * | 12/1985 | Windish et al. ............. 188/72.3 |
| 4,610,331 A | * | 9/1986 | Rogier et al. ............. 188/18 A |
| 4,883,326 A | * | 11/1989 | Sugitani et al. ............. 303/159 |
| 5,009,294 A | | 4/1991 | Ghoneim | |
| 5,186,284 A | * | 2/1993 | Lamela et al. ............. 188/71.8 |
| 5,427,195 A | | 6/1995 | Paul et al. | |
| 5,531,071 A | * | 7/1996 | Asano .......................... 60/441 |
| 5,540,299 A | | 7/1996 | Tohda et al. | |
| 5,586,630 A | | 12/1996 | Orzal | |
| 5,601,160 A | * | 2/1997 | Horsch ....................... 188/71.5 |
| 5,848,664 A | * | 12/1998 | Kaspar ........................ 180/308 |
| 6,089,357 A | * | 7/2000 | Jackson et al. ............. 188/71.6 |
| 6,253,886 B1 | * | 7/2001 | Brugait et al. .............. 188/170 |
| 6,260,668 B1 | * | 7/2001 | McClanahan ............... 188/71.5 |
| 6,273,221 B1 | * | 8/2001 | Schmidt ...................... 188/170 |
| 6,318,235 B1 | * | 11/2001 | Allart et al. .................. 91/491 |
| 6,336,323 B1 | * | 1/2002 | Tanabe et al. ................ 60/442 |
| 6,357,558 B1 | * | 3/2002 | Case et al. .................. 188/71.5 |
| 6,405,837 B1 | * | 6/2002 | Muramoto ................. 188/72.5 |
| 6,466,857 B1 | | 10/2002 | Belvo | |
| 6,471,306 B2 | | 10/2002 | Irie | |
| 6,533,368 B2 | | 3/2003 | Nishio et al. | |
| 6,547,022 B2 | | 4/2003 | Hosomi et al. | |
| 6,550,588 B2 | * | 4/2003 | Hinton et al. .............. 188/71.5 |
| 2002/0038735 A1 | * | 4/2002 | Tanabe ........................ 180/197 |
| 2002/0045510 A1 | * | 4/2002 | Damm et al. ................. 475/83 |
| 2003/0085615 A1 | * | 5/2003 | Tanabe ........................ 303/139 |

FOREIGN PATENT DOCUMENTS

| | | |
|---|---|---|
| EP | 0 698 539 A2 | 2/1996 |
| WO | WO 94/12363 A1 | 6/1994 |

* cited by examiner

Primary Examiner—Robert A. Siconolfi
Assistant Examiner—Devon Kramer
(74) Attorney, Agent, or Firm—Akin Gump Strauss Hauer & Feld, LLP

(57) ABSTRACT

If a hydraulic motor (23) (traveling wheel (27)) is rotated (or skidding) at high rate, and a hydraulic motor (24) is hardly rotated, a detection controller (68) compares the rotational speeds of both hydraulic motors (23, 24). Then the rotation detected by the rotation detectors (66, 67) to detect the traveling wheel (27) to be skidding, and moves a piston (71) to allow a negative brake (40) to give a braking force to the hydraulic motor (23), and rotate the hydraulic motor (24). In this way, this invention can release the traveling wheel from skidding without the use of a flow dividing valve.

13 Claims, 4 Drawing Sheets

HYDRAULIC CIRCUIT FOR TRAVELING

CROSS-REFERENCE TO RELATED APPLICATIONS

This application is a divisional application of U.S. application Ser. No. 09/968,205, filed Oct. 1, 2001 now U.S. Pat. No. 6,648,091.

BACKGROUND OF THE INVENTION

The present invention relates to a hydraulic circuit for traveling in which two hydraulic motors for driving the traveling wheels can be rotated by employing one hydraulic pump.

A related hydraulic circuit for traveling in which two hydraulic motors for driving the traveling wheels are rotated by one hydraulic pump is, for example, shown in FIG. 3.

This hydraulic circuit comprises: a hydraulic pump 11; two hydraulic motors 14, 15 for driving and rotating the traveling wheels 12, 13, respectively; a pumping passage 16; a flow dividing valve 17; and an opening-closing valve 19. The pumping passage 16 comprises one end connected to the hydraulic motor pump 11 and is bifurcated halfway to provide other ends respectively connected to the hydraulic motors 14, 15 so as to supply a high pressure fluid discharged from the hydraulic pump 11 to the two hydraulic motors 14, 15. The flow dividing valve 17 serving to supply an equal amount of fluid to the hydraulic motors 14, 15 is provided at the branch portion of the pumping passage 16. The opening-closing valve 19 is interposed halfway in a connection passage 18 for connecting the bifurcate portions 16a, 16b in the pumping passage 16.

And in this hydraulic circuit, if anyone of the traveling wheel, for example, a traveling wheel 12, may float due to the rough road surface, the load exerting on the hydraulic motor 14 becoming quite small, almost all amount of the high pressure fluid discharged from the hydraulic pump 11 is supplied to the hydraulic motor 14, so that the traveling wheel 12 is skidding to make traveling impossible.

In this case, by switching the opening-closing valve 19 from an open to closed state, the flow passing areas of the bifurcate portions 16a, 16b are controlled by the flow dividing valve 17 in accordance with the loads applied on the hydraulic motors 14, 15, so that the high pressure fluid from the hydraulic pump 11 is supplied in equal amount to the hydraulic motors 14, 15 to continue the traveling.

In the related hydraulic circuit, the flow dividing valve 17 is used to supply an equal amount of high pressure fluid to the hydraulic motors 14, 15. However, since this flow dividing valve 17 produces a great pressure loss when the fluid passes through it, the hydraulic motors 14, 15 have the lower pressure applied. As a result, there is the problem that the rotational torque (traction force) is lower in the scene where a great traction force is required.

SUMMARY OF THE INVENTION

It is an object of this invention to provide a hydraulic circuit for traveling that can rotate two hydraulic motors with a great rotational torque and at almost equal speed, even if different loads are applied on both hydraulic motors.

In order to solve the aforesaid object, the invention is characterized by having the following arrangement.

(1) A hydraulic circuit for traveling comprising: a hydraulic pump; two hydraulic motors for driving and rotating the traveling wheels, respectively; a pumping passage for supplying a high pressure fluid discharged from the hydraulic pump to the two hydraulic motors, the pumping passage including one end connected to said hydraulic pump and bifurcated halfway to provide the other ends being connected to the hydraulic motors, respectively; two rotation detectors for detecting the rotational speeds of the hydraulic motors, respectively; a detection controller for detecting whether or not any traveling wheel is skidding by comparing the rotational speeds detected by the rotation detectors; and two braking force applying members for applying a braking force only to the hydraulic motor of the skidding traveling wheel on the basis of the result of detection from the detection controller, the braking force applying members being installed in each of the hydraulic motors.

(2) The hydraulic circuit according to (1), wherein the braking force applying member comprises a piston for applying a braking force to the hydraulic motors when a fluid is supplied, and a control valve for controlling the fluid conducted to the piston on the basis of a signal from the detection controller.

(3) The hydraulic circuit according to (2), wherein the braking force applying member comprises a friction plate type negative brake having a rotational friction plate connected to a rotational portion of each hydraulic motor, and a stationary counterpart plate, connected to a stationary portion of each hydraulic motor, for applying a braking force to the rotational portion of said hydraulic motor when the stationary counterpart plate is brought into frictionally contact with the rotational friction plate, and the rotational friction plate and the stationary counterpart plate are brought into frictional contact with each other by the movement of the piston.

(4) The hydraulic circuit according to (2), wherein the control valve comprises a pressure reducing valve, the detection controller is connected to a foot brake, and secondary pressure of the pressure reducing valve is increased or decreased in accordance with amount of treading the foot brake under the control of the detection controller.

(5) The hydraulic circuit according to (1), wherein the detection controller is connected to a steering system for inputting a steering angle of the steering system into the detection controller, and when the traveling wheel is steered by an operation of the steering system, the detection controller does not judge that the traveling wheel is skidding even if there is a difference in rotational speed between said both hydraulic motors due to turning.

(6) A traction control system for a traveling vehicle having at least two traveling wheels driven by a single hydraulic pump through respective hydraulic motors, comprising: rotation detectors for respectively detecting rotation speeds of the traveling wheels; a computer, connected to the rotation detectors, for comparing the rotational speeds of the traveling wheels; and computer-controlled brake units respectively provided to the traveling wheels, and independently controlled by the computer.

(7) The traction control system according to (6), wherein when the computer detects that one of the traveling wheels skids, the associated computer-controlled brake unit applies a braking force to the skidding traveling wheel.

(8) The traction control system according to (7), wherein the computer is connected to a steering system for inputting a steering angle of the steering system into the computer, so as to detect the skidding traveling wheel based on the detected rotation speeds and the inputted steering angle.

(9) The traction control system according to (6), wherein the computer is connected to a foot brake, and controls the computer-controlled brake units according to an operation of the foot brake.

(10) The traction control system according to (6) further comprising a parking brake for applying braking force to both of the traveling wheels when the hydraulic pump is not driven or the hydraulic pump does not provide sufficient hydraulic pressure to the hydraulic motors.

(11) The traction control system according to (10), wherein the computer controls the computer-controlled brake units based on the difference between the rotation speeds of the traveling wheel.

(12) A brake system for a traveling vehicle having at least two traveling wheels driven by a single hydraulic pump through respective hydraulic motors, comprising: a parking brake for applying braking force to both of the traveling wheels when the hydraulic pump is not driven or the hydraulic pump does not provide sufficient hydraulic pressure to the hydraulic motors; and an auxiliary brake for applying braking force to only one of the traveling wheels independently of the parking brake.

(13) The brake system according to (12), wherein the parking brake includes first pistons for respectively applying the braking force to both of the traveling wheels when the sufficient hydraulic pressure does not act on the first pistons; and the auxiliary brake includes second pistons for the respective traveling wheel so that the respective second piston supplies the braking force to the corresponding traveling wheel when a predetermined hydraulic pressure acts on the second piston.

(14) The brake system according to (13), wherein the first piston and the second piston are formed integrally with each other with respect to each traveling wheel.

(15) The brake system according to (13), wherein the first piston and the second are formed individually with each other with respect to each traveling wheel.

(16) The brake system according to (13), wherein each of the hydraulic motors includes a friction plate connected to a rotational portion for driving the traveling wheel and a stationary counterpart plate connected to a stationary portion thereof for applying the braking force to the rotational portion when the stationary counterpart plate is brought into frictionally contact with the rotational friction plate.

(17) The brake system according to (14), wherein the rotational friction plate and the stationary counterpart plate are brought into frictional contact with each other by being urged by the first piston or the second piston.

(18) The brake system according to (12) further comprising: rotation detectors for detecting rotational speeds of the traveling wheels, respectively; and a computer, connected to the rotation detectors, for comparing the rotational speeds of the traveling wheels, wherein the computer controls the auxiliary brake based on a result of comparison.

(19) The brake system according to (18), wherein when the computer detects that one of the traveling wheels skids, the auxiliary brake unit applies a braking force to the skidding traveling wheel.

For example, suppose that one traveling wheel floats from the road surface, and one hydraulic motor for driving the traveling wheel has a quite small load. In such a case, the high pressure fluid from the hydraulic pump is substantially supplied to one hydraulic motor, so that one hydraulic motor is rotating (skidding) at high speed and the other hydraulic motor hardly rotates. Herein, the rotational speeds of the hydraulic motors are detected by the rotation detector, respectively, and the results of detection are output to detection controller. At this time, the detection controller detects that one traveling wheel is skidding by comparing the results of detection.

In this way, if one traveling wheel is detected to be skidding, the detection controller activates one braking force applying member to apply a braking force to one hydraulic motor alone, and balance the load of one hydraulic motor with that of the other hydraulic motor. Thereby, the high pressure fluid is also supplied to the other hydraulic motor, which is then rotated to continue the traveling. And if the other hydraulic motor is rotated, all the fluid discharge from the hydraulic pump is not supplied to one hydraulic motor, whereby it is possible to prevent one hydraulic motor from being damaged due to over speed.

Since there is no need of employing the flow dividing valve to release the skidding, the high pressure fluid supplied to both hydraulic motors produces less pressure loss, so that both hydraulic motors can be easily rotated with a great rotational torque and at almost equal speed.

Also, the braking force can be applied to the hydraulic motors in a simple constitution.

Further, the negative brakes installed in the hydraulic motors can be directly employed to apply the braking force to the traveling wheels that are skidding.

Also, the braking force applied to the hydraulic motors can be easily controlled.

Moreover, even if there is a difference in rotational speed between both hydraulic motors at the time of turning, it is possible to prevent the false recognition that the traveling wheel is skidding.

The present disclosure relates to the subject matter contained in Japanese Patent Application No. 2000-302642 (filed on Oct. 2, 2000), which is expressly incorporated herein by reference in its entirety.

DETAILED DESCRIPTION OF PREFERRED EMBODIMENTS

One embodiment of the present invention will be described below with reference to the accompanying drawings.

Figure 1:
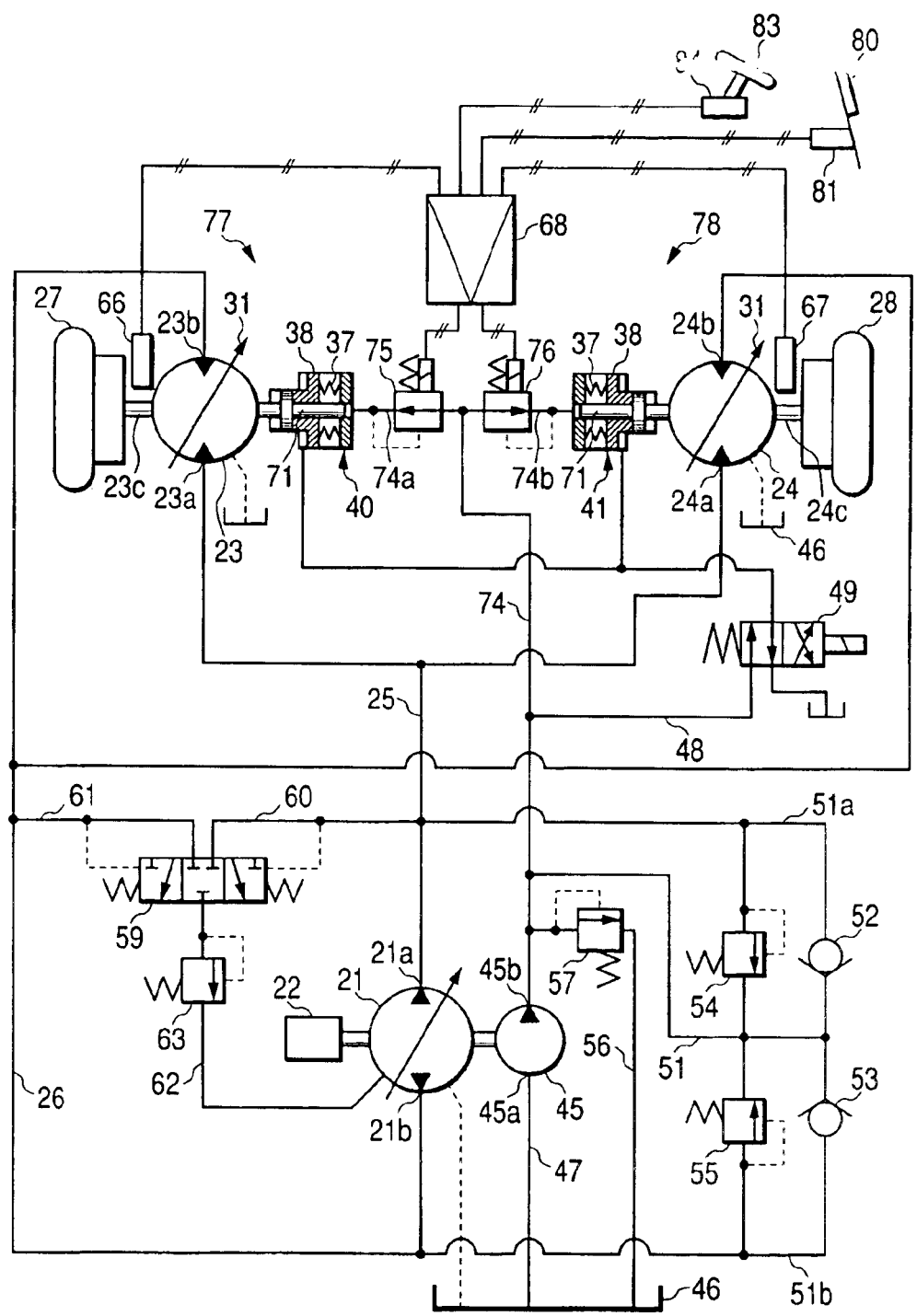
FIG. 1 is a circuit diagram showing one embodiment of the present invention.
Figure 2:
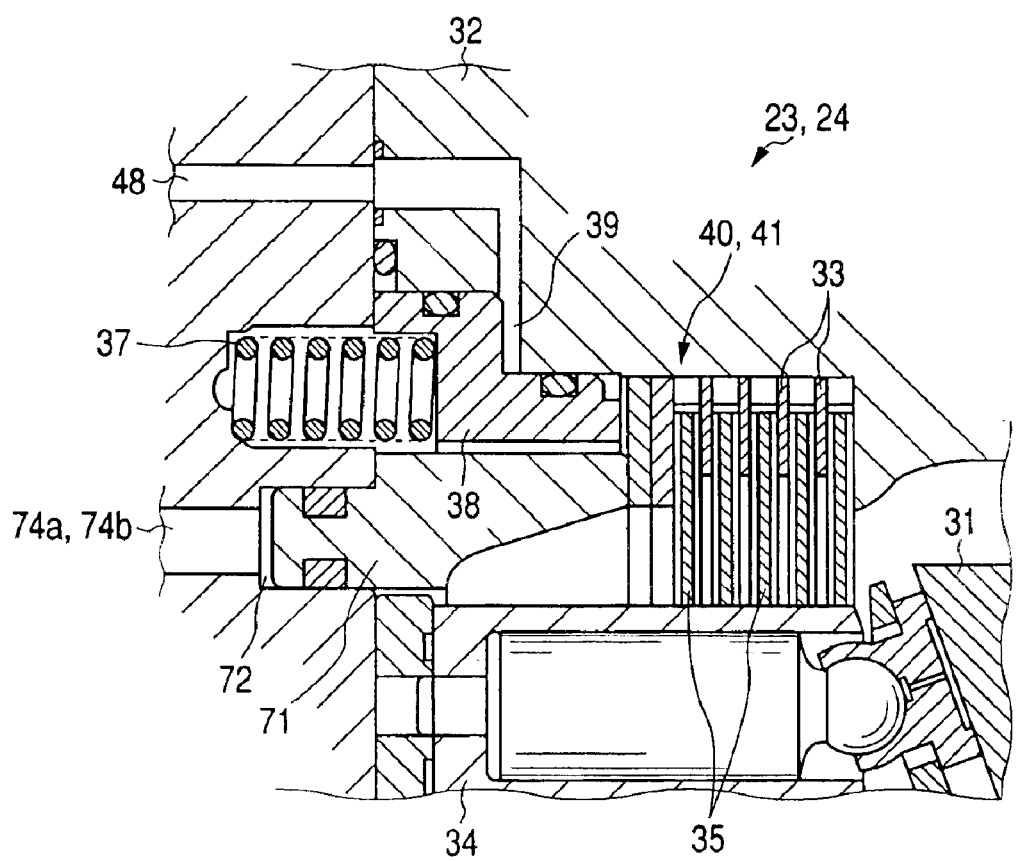
FIG. 2 is a cross-sectional view around a negative brake.
Figure 3:
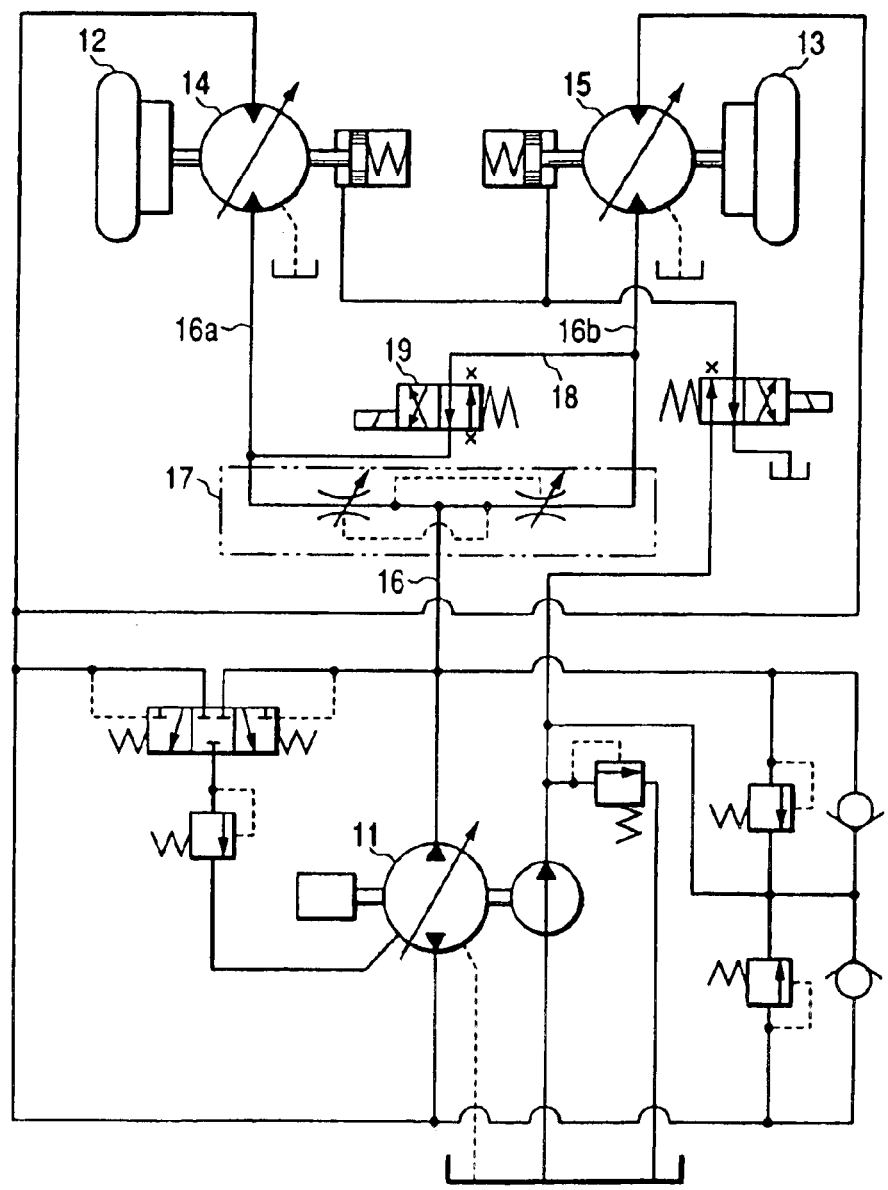
FIG. 3 is a circuit diagram showing one example of the related hydraulic circuit for traveling.

In FIGS. 1 and 2, reference numeral 21 denotes a variable displacement hydraulic pump, and this hydraulic pump 21, when driven by an engine 22, discharges a high pressure fluid through a flow inlet-outlet opening 21a or 21b. Reference numerals 23, 24 denote two variable displacement hydraulic motors having the flow inlet-output openings 23a, 23b and the flow inlet-outlet openings 24a, 24b, respectively. A pumping passage 25 includes one end connected to the flow inlet-outlet opening 21a of the hydraulic pump 21, and is bifurcated halfway to provide other ends respectively connected to the flow inlet-outlet openings 23a, 24a of these hydraulic motors 23, 24. A pumping passage 26 includes one end connected to the flow inlet-outlet opening 21b of the hydraulic pump 21 and is bifurcated halfway to provide other ends respectively connected to the flow inlet-outlet openings 23b, 24b of these hydraulic motors 23, 24.

Consequently, a high pressure fluid discharged from the hydraulic pump 21 is supplied through the pumping passage 25 or 26 to two hydraulic motors 23, 24, and a low pressure fluid flowing from the hydraulic motors 23, 24 is returned through the remaining pumping passage 25 or 26 to the hydraulic pump 21, so that the hydraulic motors 23, 24 are driven to rotate the rotational shafts 23c, 24c in a forward or backward direction. Since the traveling wheels 27, 28 for the civil construction machine or the like are connected to these rotational shafts 23c, 24c, respectively, these traveling wheels 27, 28 are rotated together with the rotational shafts 23c, 24c, whereby the civil construction machine can travel.

Herein, the hydraulic motors 23, 24 employs a swash plate type hydraulic motor having a swash plate 31 capable of changing the angle of inclination thereof, as shown in FIG. 2. Also, one or more ring-like stationary counterpart plates 33 are connected axially movably on a stationary portion of the hydraulic motor 23, 24 (the inner peripheries of the stationary casing 32 of the hydraulic motor 23, 24 in this embodiment) by spline connection or mating at two positions. On the other hand, one or more ring-like rotational friction plates 35 are connected axially movably on the rotational portion of the hydraulic motor 23, 24 (the outer peripheries of a cylinder block 34 of the hydraulic motor 23, 24 in this embodiment) by spline connection or mating at two positions to be rotatable integrally with the cylinder block 34. The stationary counterpart plate 33 and the rotational friction plate 35 are disposed alternately in the axial direction.

Reference numeral 37 denotes a plurality of springs disposed on one side of the rotational friction plate 35, these springs 37 bring the stationary counterpart plate 33 and the rotational friction plate 35 into frictional contact with each other via a substantially cylindrical braking piston 38, providing a braking force to the rotational portion of the hydraulic motors 23, 24. Reference numeral 39 denotes a cylinder chamber formed between the stationary casing 32 and the braking piston 38, in which if a high pressure fluid is supplied into the cylinder chamber 39, the braking piston 38 is moved to one side against the springs 37. Thereby, the braking piston 38 is separated from the stationary counterpart plate 33 and the rotational friction plate 35 to disengage them from the frictional contact, so as to release the braking for the rotational portion.

On one hand, if a fluid is exhausted from the cylinder chamber 39, the braking piston 38 is urged by the springs 37 and brings the stationary counterpart plate 33 and the rotational friction plate 35 into frictional contact with each other. The stationary counterpart plate 33, the rotational friction plate 35, the springs 37 and the braking piston 38, as a whole, constitute a pair of negative brakes 40, 41 to provide a braking force to the hydraulic motors 23, 24.

Reference numeral 45 denotes a hydraulic pump which is driven with the hydraulic pump 21 by the engine 22 to discharge a high pressure fluid, a suction opening 45a of this hydraulic pump 45 being connected through a suction passage 47 to a tank 46. A discharge opening 45b of the hydraulic pump 45 is connected to one end of a supply passage 48, which is bifurcated halfway, the other ends of the supply passage 48 being connected to the cylinder chambers 39 of the negative brakes 40, 41, respectively. A directional control valve 49 is interposed in the supply passage 48 between the hydraulic pump 45 and the branch portion. If this directional control valve 49 is switched to an oblique flow position, a high pressure fluid discharged from the hydraulic pump 45 is supplied to the cylinder chambers 39 of the negative brakes 40, 41. On the other hand, if the directional control valve 49 is switched to a parallel flow position, a fluid from the cylinder chambers 39 of the negative brakes 40, 41 is exhausted into the tank 46.

Reference numeral 51 denotes a make-up feed passage having one end connected to the supply passage 48 between the hydraulic pump 45 and the directional control valve 49, bifurcated halfway, with the other ends connected to the pumping passages 25, 26, respectively. The bifurcate portions 51a, 51b of this make-up feed passage 51 are provided with the check valves 52, 53 for permitting only a flow of fluid to the pumping passages 25, 26, respectively. And a high pressure fluid discharged from the hydraulic pump 45 is refilled through the make-up feed passage 51 to the pumping passage 25 or 26 on the lower pressure side, when the check valve 52 or 53 is opened.

Reference numerals 54, 55 denotes a relief valve provided in the make-up feed passage 51, these relief valves 54, 55 being arranged in parallel to the check valves 52, 53, respectively. Reference numeral 56 denotes a relief passage having one end connected to the supply passage 48 between the hydraulic pump 45 and the directional control valve 49, with the other end being connected to the tank 46, a relief valve 57 being interposed halfway in this relief passage 56.

Reference numeral 59 denotes a flushing valve, which is connected to the other ends of the first and second passages 60, 61 having one ends connected to the pumping passages 25, 26, respectively. If this flushing valve 59 is turn open by a pilot pressure from the first or second passage 60 or 61 on the high pressure side, a fluid in the first or second passage 60, 61 on the low pressure side is flowed out through a flow-out passage 62 to a drain chamber of the hydraulic pump 21, refreshing the fluid within the pumping passages 25, 26 continuously and cooling the hydraulic pump 21. Reference numeral 63 denotes a low pressure relief valve interposed halfway in the flow-out passage 62.

Reference numerals 66, 67 denote the rotation detectors such as rotary encoder for detecting the rotational speed of the hydraulic motors 23, 24. These two rotation detectors 66, 67 detect the rotational speed of the traveling wheels 27, 28 or the rotational shafts 23c, 24c, thereby detecting the rotational speed of the hydraulic motors 23, 24, and output its detection result to detection controller 68 connected to the rotation detectors 66, 67 and composed of a CPU. The detection controller 68 compares the rotational speeds of the hydraulic motors 23, 24 detected by the rotation detectors 66, 67, and determines that either the traveling wheel 27 or 28 is skidding if the difference is greater than or equal to a predetermined value.

Reference numeral 71 denotes a cylindrical piston disposed in a superposed state radially inside the braking piston 38 constituting the negative brakes 40, 41. This cylindrical piston 71 is moved to the other side and brings the stationary counterpart plate 33 and the rotational friction plate 35 into frictional contact with each other to provide a braking force to the hydraulic motors 23, 24, if a high pressure fluid is supplied to a cylinder chamber 72 formed between the stationary casing 32 and the piston 71.

On the other hand, if the supply of high pressure fluid to the cylinder chamber 72 is stopped, the piston 71 is separated from the stationary counterpart plate 33 and the rotational friction plate 35 to disengage them from the frictional contact, so that the rotational portion of the hydraulic motors 23, 24 is released from braking. In this way, the stationary counterpart plate 33 and the rotational friction plate 35 of the negative brakes 40, 41 are brought into frictional contact by the piston 71, the negative brakes 40, 41 already installed in the hydraulic motors 23, 24 can be directly employed to provide the braking force to the traveling wheels 27, 28 that are skidding, resulting in simple structure and moderate price.

Reference numeral 74 denotes a fluid passage having one end connected to the supply passage 48 between the hydraulic pump 45 and the directional control valve 49, bifurcated halfway, with the other ends being connected to the cylinder chambers 72 of the negative brakes 40, 41. In the bifurcate portion 74a, 74b of this fluid passage, the control valves (the pressure reducing valves 75, 76 in this embodiment) for controlling the high pressure fluid to be led to the piston 71 in accordance with a control signal from the detection controller 68 are interposed.

The detection controller 68 controls the pressure reducing valve 75 or 76 by outputting a control signal to the coil of corresponding pressure reducing valve 75 or 76 if detecting that either of the traveling wheels 27, 28 is skidding. Thereby, a high pressure fluid is supplied from the hydraulic pump 45 to the cylinder chamber 72 of the hydraulic motor 23 or 24 to provide a braking force to the hydraulic motor 23 or 24.

The piston 71 and the pressure reducing valves 75, 76, as a whole, are installed in the hydraulic motors 23, 24, respectively, and constitute two braking force applying members 77, 78 for applying a braking force only to the skidding hydraulic motors 23, 24 of the traveling wheel 27, 28 in accordance with the detection result of the detection controller 68. If each braking force applying members 77, 78 is constituted by the piston 71 and the pressure reducing valves 75, 76, it is possible to apply a braking force to the hydraulic motors 23, 24 in a simple construction.

In this embodiment, the detection controller 68 is connected to a foot brake 80 of the civil construction machine, more particularly, a detection sensor for detecting the amount of treading the foot brake 80, the amount of treading the foot brake 80 detected by the detection sensor 81 is input into the detection controller 68, and a control signal from the detection controller 68 in accordance with the amount of treading the foot brake 80 is output to the coil (particularly a proportional coil) of the pressure reducing valve 75 or 76, increasing or decreasing the secondary pressure of the pressure reducing valve 75 or 76.

Thereby, the pressure of the fluid supplied to the cylinder chamber 72 of the hydraulic motor 23 or 24, in other words, a braking force provided from the negative brakes 40, 41 to the hydraulic motors 23, 24 can be easily controlled in a range of appropriate values.

Herein, if the civil construction machine turns while traveling, the rotational speed of the inward traveling wheel is slower than the rotational speed of the outward traveling wheel, thereby bringing about the danger that the detection controller 68 detects the outward traveling wheel to be skidding even if the traveling wheel is not actually skidding.

Therefore, in this embodiment, the detection controller 68 is connected to the steering system 83, for example, the detection sensor 84 for detecting the steering angle (motion amount) of a steering shaft, to input the steering angle of the steering system 83 detected by the detection sensor 84 into the detection controller 68. Thereby, when the civil construction machine is turning by the operation of the steering system 83, even though there is a difference in rotational speed between the hydraulic motors 23, 24 depending on the steering angle, it is not determined on the basis of such difference that either of the hydraulic motors 23, 24 is skidding to prevent the false recognition.

The operation of this embodiment of this invention will be set forth below.

When the engine 22 is started, the hydraulic pumps 21, 45 are rotated in the forward direction, and a high pressure fluid is discharged from the hydraulic pumps 21, 45 to the pumping passage 25 and the supply passage 48, the high pressure fluid discharged from the hydraulic pump 21 is flowed into the hydraulic motors 23, 24 simultaneously. Thereby, the rotational shafts 23c, 24c of the hydraulic motors 23, 24 are rotated together with the traveling wheels 27, 28, so that the civil construction machine moves in forward direction. In this time, a return fluid with low pressure that flows out of the hydraulic motors 23, 24 gets back through the pumping passage 26 to the hydraulic pump 21, but if the fluid is circulating between the hydraulic pump 21 and the hydraulic motors 23, 24 without returning to the tank, there is the danger that the temperature rises, causing the deterioration with time.

However, in this embodiment, the high pressure fluid discharged from the fluid pump 45 pushes open the check valve 53 to be always refilled to the pumping passage 26 on the low pressure side, so that the fluid within the circuit is replaced successively, thereby preventing the deterioration. And if the fluid is refilled to the pumping passage 26, the amount of fluid within the circuit increases to raise the circuit pressure, but at this time, excess fluid is exhausted through the flushing valve 59 and the relief valve 63 to a drain chamber of the hydraulic pump 21. Thereby, the circuit pressure is prevented from rising. And the hydraulic pump 21 is cooled.

At this time, since the directional control valve 49 is switched to the oblique flow position, the high pressure fluid discharged from the hydraulic pump 45 is supplied through the supply passage 48 to the cylinder chamber 39 of the negative brakes 40, 41. As a result, the braking pistons 38 of the negative brakes 40, 41 are separated from the stationary counterpart plate 33 and the rotational friction plate 35 to disengage them from the frictional contact, and release the rotational portion of the hydraulic motors 23, 24 from braking.

When the machine moves in the forward direction, the rotational speeds of the traveling wheels 27, 28 detected by the rotation detectors 66, 67 are output to the detection controller 68. However, since the rotational speeds of the traveling wheels 27, 28 are substantially the same, even if both rotational speeds are compared, its difference is less than the predetermined value. Consequently, the detection controller 68 determines that any traveling wheels 27, 28 are not skidding. In such case, the detection controller 68 controls the pressure reducing valves 75, 76 so that the secondary pressure of the pressure reducing valves 75, 76 becomes zero by outputting a control signal to the coil of the pressure reducing valves 75, 76. Thereby, no high pressure fluid is supplied to the cylinder chamber 72 of the negative brakes 40, 41, so that no braking force is provided to the rotational portion of any of the hydraulic motors 23, 24.

For example, suppose that the traveling wheel 27 floats from the road surface, and the load of the hydraulic motor 23 for driving the traveling wheel 27 is quite small. At such time, since almost all the high pressure fluid from the hydraulic pump 21 is supplied to the hydraulic motor 23, the hydraulic motor 23 is rotated (skidding) at high rate, bringing about the danger that the hydraulic motor 24 can be hardly rotated.

However, in this embodiment, the hydraulic motor 23 is released from skidding, and the hydraulic motors 23, 24 are rotated at the approximately same rotational speed, as described below. That is, the rotational speeds of the hydraulic motors 23, 24 are detected by the rotation detectors 66, 67, and the detection result are output to the detection controller in the same manner as described previously. At this time, the detection controller 68 compares the detection results, since the differential value from the rotational speed of the hydraulic motor 23 subtracted by the rotational speed of the hydraulic motor 24 is greater than or equal to the predetermined value, the traveling wheel 23 is detected to be skidding.

In this way, if the traveling wheel 23 is detected to be skidding, the detection controller 68 outputs a control signal in accordance with the amount of treading the foot brake 80 to the coil (proportional coil) of corresponding pressure reducing valve 75, and increases the secondary pressure of the pressure reducing valve 75 in accordance with the value of the control signal. Thereby, the fluid at an appropriate pressure is supplied to the cylinder chamber 72 of the hydraulic motor 23, so that the piston 71 is moved to the other side. As a result, the stationary counterpart plate 33 and the rotational friction plate 35 for the negative brake 40 are brought into frictional contact with each other to provide a braking force of appropriate value only to the hydraulic motor 23.

Consequently, the load exerting on the hydraulic motor 23 approaches to the load on the hydraulic motor 24, so that the high pressure fluid from the hydraulic pump 21 is supplied to the hydraulic motor 24. Thereby, the hydraulic motor 24 and the traveling wheel 28 are rotated, whereby the civil construction machine can travel continuously. And if the hydraulic motor 24 is rotated, as described previously, all the fluid discharged from the hydraulic pump 21 is not supplied to the hydraulic motor 23, thereby preventing the hydraulic motor 23 from being damaged due to over speed.

Since there is no need of employing the flow dividing valve to release the skidding, the high pressure fluid supplied to the hydraulic motors 23, 24 does not have pressure loss, so that both hydraulic motors 23, 24 can be easily rotated with large rotational torque and at almost equal speed.

In the above embodiment, a piston 71 different from the braking piston 38 for the negative brakes 40, 41 is provided, and the stationary counterpart plate 33 and the rotational friction plate 35 for the negative brakes 40, 41 are brought into frictional contact with each other by the piston 71. However, the fluid from the control valve may be led to the braking piston of the negative brake, to bring the stationary counterpart plate and the rotational friction plate into frictional contact with each other.

In the above embodiment, the pressure of the fluid led to the piston 71 of the braking force applying members 77, 78 is adjusted by changing the secondary pressure of the pressure reducing valves 75, 76 in accordance with the amount of treading the foot brake 80. However, in this invention, the control valve may be a simple opening-closing valve so that the fluid at equal pressure to that within the fluid passage is led to the piston of braking force applying members.

Figure 4:
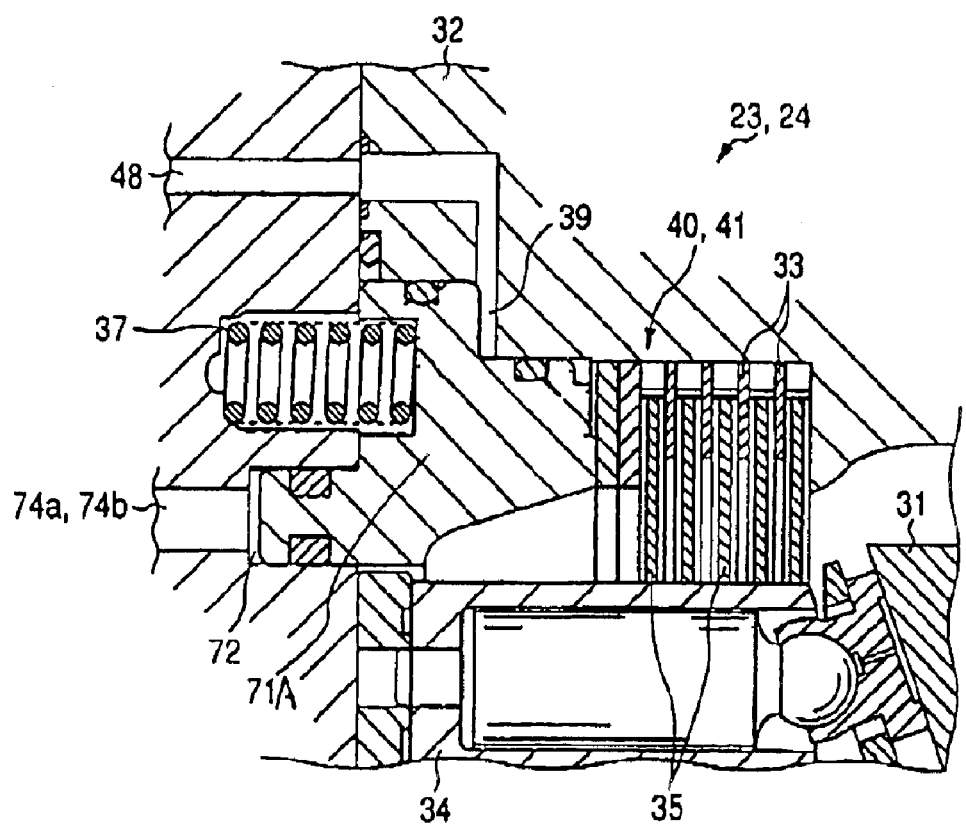
FIG. 4 is a cross-sectional view of a negative brake of the present invention with an integral piston.

Further, referring to FIGS. 2 and 4, in the above embodiment, the braking piston 38 and the piston 71 are separately provided. However, the braking piston 38 and the piston 71 may be formed integrally so as to form an integral piston 71A (FIG. 4). In this case, the cylinder chamber 39 and the cylinder chamber 72 are respectively formed at opposite sides of the integral piston 71A so that the braking force is applied when the high pressure fluid is not supplied into the cylinder chamber 39 or when the high pressure fluid is supplied into the cylinder chamber 72, and so that the braking force is not applied when the high pressure fluid is supplied into the cylinder chamber 39 or when the high pressure fluid is not supplied into the cylinder chamber 72. That is, when the sum of the spring force of the spring 37 and the pressure in the cylinder chamber 72 is larger than the pressure in the cylinder chamber 39, the braking force is applied, and when the sum of the spring force of the spring 37 and the pressure in the cylinder chamber 72 is smaller than the pressure in the cylinder chamber 39, the braking force is not applied. Consequently, the construction of the cylinder is simplified.

Further, in the above embodiment, the piston 38 and the piston 71 act on the same stationary counterpart plate 33 and the rotational friction plate 35 to generate the braking force. However, an individual set off the stationary counterpart plate and the rotational friction plate may be provided, each being driven by a respective piston 38 or 71.

In the above embodiment, the present invention has been described with reference to the construction of the hydraulic circuit. The present invention is also featured by a traction control system for the traveling vehicle which includes: rotation detectors for respectively detecting rotation speeds of the traveling wheels 27, 28; a computer, connected to the rotation detectors, for comparing the rotational speeds of the traveling wheels; and computer-controlled brake units respectively provided to the traveling wheels, and independently controlled by the computer.

The rotation detectors correspond to the rotation detectors 66, 67, the computer corresponds to the detection controller 68, and the computer-controlled brake units correspond to the braking force applying members 77, 78 and the pressure reducing valves 75, 76 in the above embodiment.

Since the computer is connected to the rotation detectors and is capable of processing the outputs from the rotation detectors and individually controlling the computer-controlled brake units, the computer-controlled brake units can be suitably controlled by the computer. For example, when the computer detects, based on the output from the rotation detectors, that the one of traveling wheels is skidding, the computer outputs a control signal to the computer-controlled brake unit, with which the skidding traveling wheel is associated, for applying a braking force to the skidding traveling wheel. Therefore, the skidding traveling wheel stops skidding and all of the traveling wheels are normally rotated.

The computer may be further connected to the foot brake and the steering system. In this case, the computer can control the computer-controlled brake units based on the outputs from the rotation detectors and further the foot brake and the steering system as mentioned above. Therefore, braking controllability of the computer is enhanced.

Further, a parking brake corresponding to the negative brakes 40, 41 in the above embodiment may be employed in the traction control system. The parking brake is adapted to apply the braking force to all of the traveling wheels when the hydraulic pump is not driven or the hydraulic pump does not provide sufficient hydraulic pump to the hydraulic motors and is separately controlled from the computer-controlled brake units. Therefore, the traveling wheels can be controlled by both of the computer-controlled brake units and the parking brake depending on the purpose of brake.

The present invention is also featured by a brake system for the traveling vehicle includes: a parking brake for applying braking force to the traveling wheels 27, 28 when the hydraulic pump is not driven or the hydraulic pump does not provide sufficient hydraulic pressure to the hydraulic motors; and an auxiliary brake for applying braking force to only one of the traveling wheels independently of the parking brake.

The parking brake corresponds to the negative brakes 40, 41, and the auxiliary brake corresponds to the braking force applying members 77, 78 and the pressure reducing valves 75, 76 in the above embodiment.

The parking brake is adapted to apply the braking force to the traveling wheels 27, 28 so that the braking force for the traveling wheels 27, 28 is substantially same with each other, and the auxiliary brake is adapted to apply the braking force only one of the traveling wheels. Therefore, the suitable braking force for each traveling wheel can be applied by combining the parking brake and the auxiliary brake. Particularly, when one of the traveling wheels is skidding, the auxiliary brake applies the braking force to the skidding traveling wheel, so that the skidding traveling wheel stops skidding and all of the traveling wheels can be normally rotated.

A computer corresponding to the detection controller 68 in the above embodiment may be connected to the auxiliary brake to control it. The computer is connected to the rotation detectors 66, 67 for detecting rotational speeds of the traveling wheels, so that the computer can control the auxiliary brake based on the rotational speeds of the traveling wheels.

As described above, with this invention, even if two hydraulic motors have different loads, the hydraulic motors can be rotated with a large rotational torque and at almost equal speed.

I claim:

1. A brake system for a traveling vehicle having at least two traveling wheels driven by a single hydraulic pump through respective hydraulic motors, comprising:
   a parking brake for applying braking force to all of said at least two traveling wheels when the hydraulic pump is not driven or the hydraulic pump does not provide sufficient hydraulic pressure to the hydraulic motors;
   at least two auxiliary brakes, each auxiliary brake applying braking force to only one of the traveling wheels independently of the parking brake, the braking force being provided directly to a rotational portion of the corresponding hydraulic motor;
   at least two rotation detectors, each rotation detector detecting rotational speeds of the respective traveling wheels; and
   a computer connected to the rotation detectors for comparing the rotational speeds of the traveling wheels, wherein the computer controls one of the auxiliary brakes to apply a braking force selectively to the corresponding traveling wheel based on a result of the comparison.

2. The brake system according to claim 1, wherein
   the parking brake includes first pistons for respectively applying the braking force to both of the traveling wheels when the sufficient hydraulic pressure does not act on the first pistons; and
   the auxiliary brake includes second pistons for the respective traveling wheel so that the respective second piston supplies the braking force to the corresponding traveling wheel when a predetermined hydraulic pressure acts on the second piston.

3. The brake system according to claim 2, wherein the first pistons and the second pistons are formed integrally with each other with respect to each traveling wheel.

4. The brake system according to claim 2, wherein the first pistons and the second pistons are formed individually with each other with respect to each traveling wheel.

5. The brake system according to claim 2, wherein each of the hydraulic motors includes a friction plate connected to a rotational portion for driving the traveling wheel and a stationary counterpart plate connected to a stationary portion thereof for applying the braking force to the rotational portion when the stationary counterpart plate is brought into frictional contact with the rotational friction plate.

6. The brake system according to claim 3, wherein a rotational friction plate and a stationary counterpart plate are brought into frictional contact with each other by being urged by the first pistons or the second pistons.

7. The brake system according to claim 1, wherein when the computer detects that one of the traveling wheels skids, the computer controls the corresponding auxiliary brake to apply a braking force to the skidding traveling wheel.

8. The brake system according to claim 7, wherein the computer determines that either of the traveling wheels is skidding if a difference in the rotational speeds is greater than or equal to a predetermined value.

9. The brake system according to claim 1, wherein a control valve is interposed in a fluid passage between the hydraulic pump and the corresponding auxiliary brake for controlling a high pressure fluid to be led to the auxiliary brake.

10. The brake system according to claim 9, wherein the control valve is electrically connected to the computer so as to receive a control signal from the computer.

11. The brake system according to claim 9, wherein a control signal in accordance with an amount of treading of a foot brake is output from the computer to the control valve.

12. The brake system according to claim 9, wherein the control valve is a pressure reducing valve.

13. The brake system according to claim 1 wherein the braking force is provided directly to the rotational portion of the corresponding hydraulic motor so that an amount of fluid that is supplied to said hydraulic motor is limited.

* * * * *